US012346051B2

(12) United States Patent
Yamauchi

(10) Patent No.: US 12,346,051 B2
(45) Date of Patent: Jul. 1, 2025

(54) IMAGE FORMING SYSTEM WITH ADJUSTABLE IMAGE FORMING SPEED AND ADJUSTABLE LAMINATION SPEED

(71) Applicant: Konica Minolta, Inc., Tokyo (JP)

(72) Inventor: Yuki Yamauchi, Nishitokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/407,909

(22) Filed: Jan. 9, 2024

(65) Prior Publication Data

US 2024/0241469 A1 Jul. 18, 2024

(30) Foreign Application Priority Data

Jan. 13, 2023 (JP) ................................. 2023-003493

(51) Int. Cl.
*G03G 15/00* (2006.01)
*B41J 11/00* (2006.01)

(52) U.S. Cl.
CPC ...... *G03G 15/6582* (2013.01); *B41J 11/0015* (2013.01); *G03G 15/5008* (2013.01); *G03G 2215/00426* (2013.01); *G03G 2215/00945* (2013.01); *G03G 2215/00949* (2013.01)

(58) Field of Classification Search
CPC ........... G03G 15/5008; G03G 15/6582; G03G 15/6573; G03G 2215/00426; G03G 2215/00801; G03G 2215/00805; G03G 2215/00945; G03G 2215/00949; B41J 11/0015
USPC .......................................................... 399/342
See application file for complete search history.

(56) References Cited

U.S. PATENT DOCUMENTS 5,306,381 A * 4/1994 Nakazawa .............. B32B 38/14 219/508
5,894,318 A * 4/1999 Endo .................. G03G 15/2064 347/264
2002/0118987 A1* 8/2002 Takekoshi ............. B41J 29/377 399/342
2005/0163522 A1* 7/2005 Carlson .............. G03G 15/2064 399/342
2023/0004106 A1* 1/2023 Hase .................. G03G 15/6591

FOREIGN PATENT DOCUMENTS

JP 63006586 A * 1/1988
JP H05338039 A 12/1993
JP 2820733 B2 * 11/1998

* cited by examiner

*Primary Examiner* — Robert B Beatty
(74) *Attorney, Agent, or Firm* — CANTOR COLBURN LLP

(57) ABSTRACT

An image forming system includes, an image former configured to form an image on a recording medium that is a flat cut sheet; a laminator that is disposed on a downstream side of the image former in a conveyance direction of the recording medium and that laminates the recording medium on which the image is formed by the image former; and a hardware processor configured to adjust at least one of a lamination speed in the laminator and/or an image forming speed in the image former.

13 Claims, 6 Drawing Sheets

IMAGE FORMING SYSTEM WITH ADJUSTABLE IMAGE FORMING SPEED AND ADJUSTABLE LAMINATION SPEED

CROSS-REFERENCE TO RELATED APPLICATIONS

The present invention claims priority under 35 U.S.C. § 119 to Japanese Application, 2023-003493, filed on Jan. 13, 2023, the entire contents of which being incorporated herein by reference.

BACKGROUND

Technical Field

The present invention relates to an image forming system.

Description of Related Art

Conventionally, there has been known a laminating apparatus that performs a laminating process on a sheet on which an image has been formed by an image forming section disposed on an upstream side (see, for example, Japanese Unexamined Patent Publication No. H5-338039). In the laminating process, a transparent synthetic resin film (laminate film) is coated on a sheet.

There is a problem that an adhesive surface of a laminate film is exposed in a conveyance section because a space is formed between sheets at the time of image formation in an apparatus for laminating flat cut sheets. In order to solve this problem, a device in which an adhesive layer is not exposed is known. The apparatus designed so that the adhesive layer is not exposed is an apparatus for attaching another film (under film) on the adhesive surface side of the laminate film.

In the laminating apparatus, in a case where there is a difference between the time required for image formation and the time required for lamination, the distance between consecutive sheets varies depending on the content of the job. In a case where the distance between the sheets is too large, the laminating apparatus wastes the laminating film and the under film corresponding to the distance between the sheets. On the other hand, the laminating apparatus has a problem that an appropriate product cannot be obtained when the distance between the sheets becomes too small.

SUMMARY OF THE INVENTION

An object of the present invention is to provide an image forming system capable of obtaining an appropriate product while suppressing waste of an expensive laminate film.

In order to solve the above problem, according to an aspect of the present invention, the image forming system includes, an image former configured to form an image on a recording medium that is a flat cut sheet; a laminator that is disposed on a downstream side of the image former in a conveyance direction of the recording medium and that laminates the recording medium on which the image is formed by the image former; and a hardware processor configured to adjust at least one of a lamination speed in the laminator and/or an image forming speed in the image former.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

Hereinafter, embodiments of the present invention will be described in detail with reference to the drawings.

Figure 1:
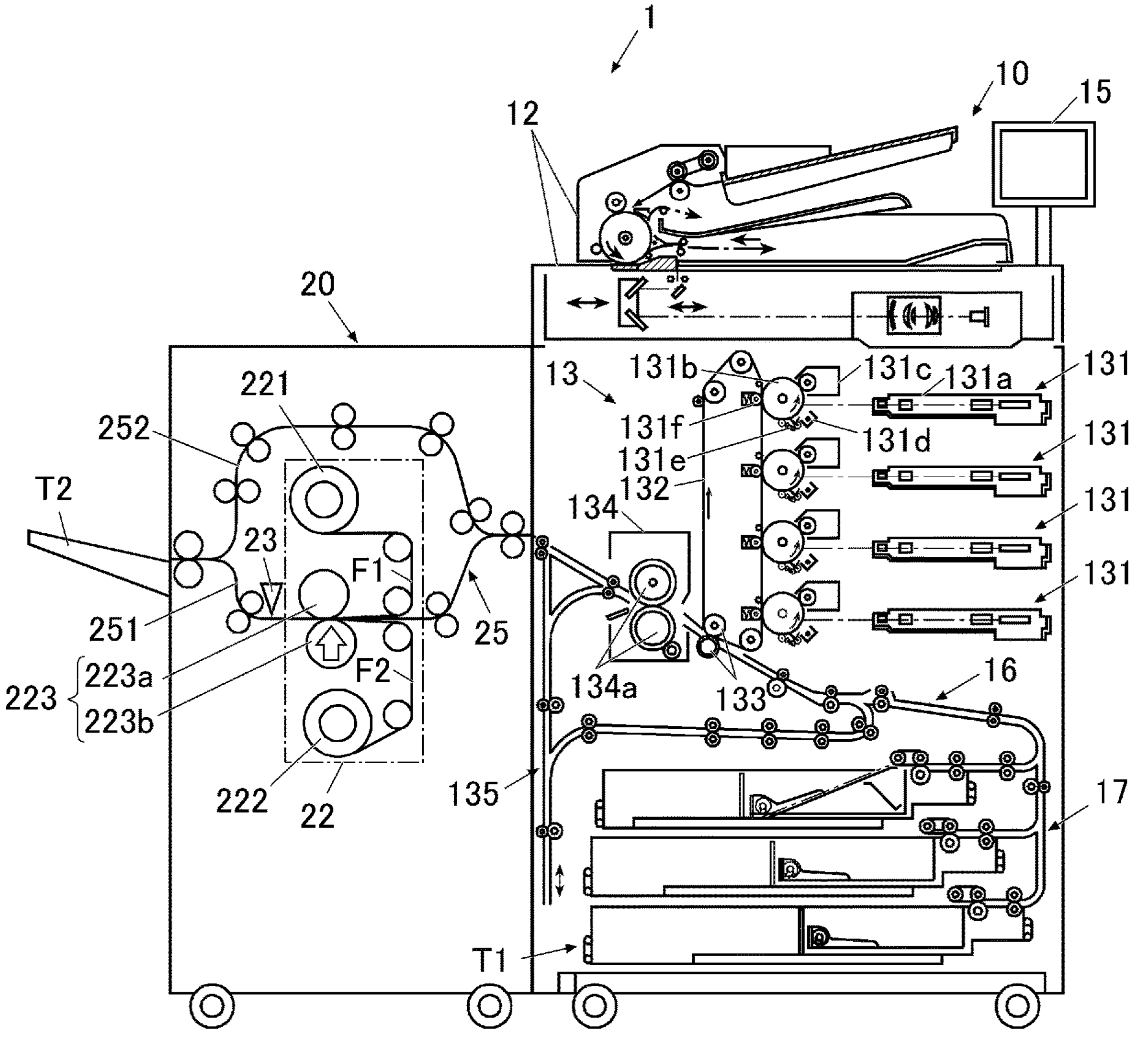
FIG. 1 is a diagram illustrating a schematic configuration of an image forming system according to the present embodiment.

As shown in FIG. 1, the image forming system 1 according to the present embodiment includes an image forming apparatus 10 and a laminating apparatus 20.

The image forming apparatus 10 forms an image on a sheet (recording medium) that is a flat cut sheet, based on print data.

Figure 2:
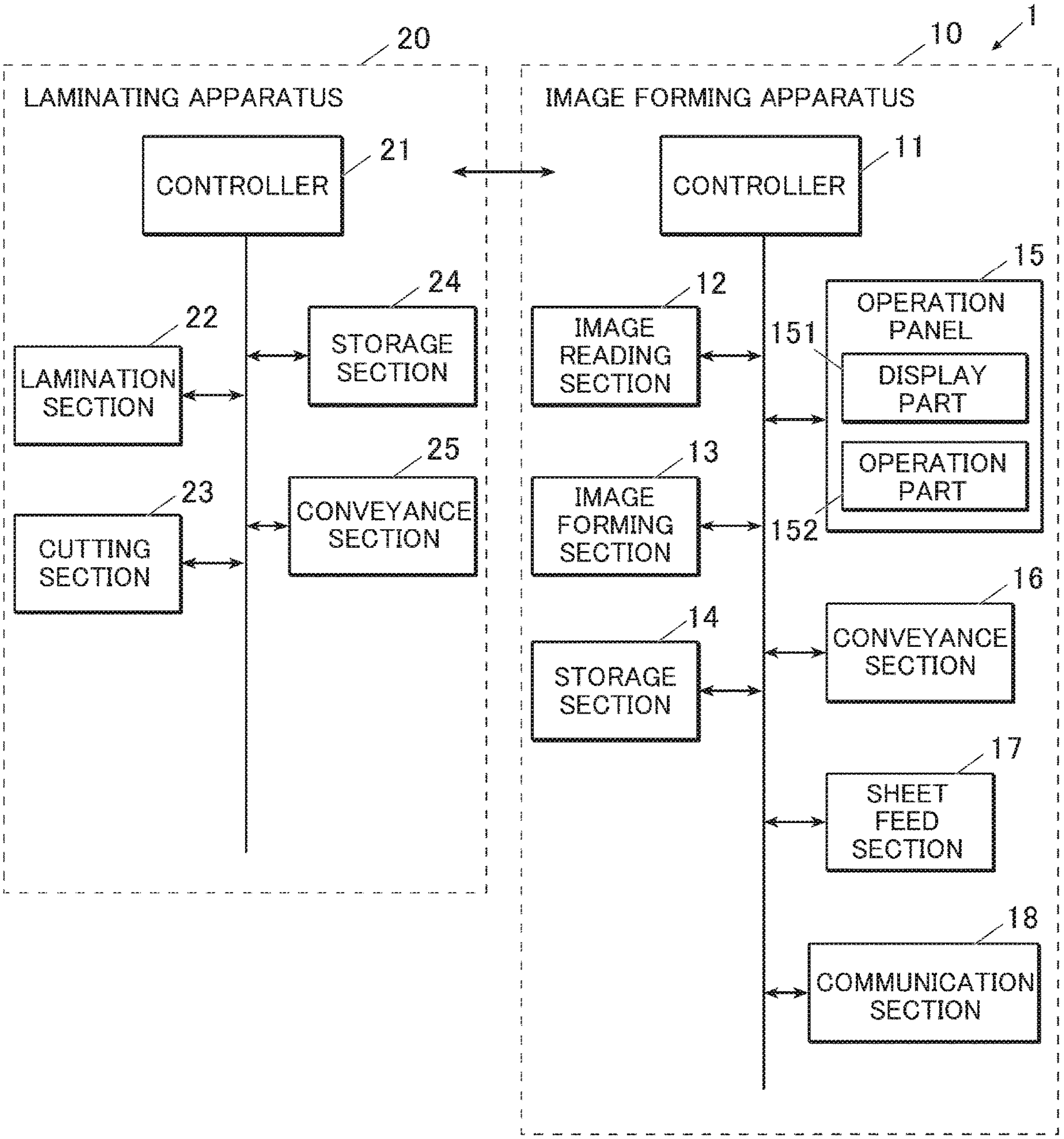
FIG. 2 is a block diagram showing a functional configuration of the image forming system according to the present embodiment.

As shown in FIG. 1 and FIG. 2, the image forming apparatus 10 includes a controller 11 (hardware processor), an image reading section 12, an image forming section (image former) 13, a storage section 14, an operation panel 15, a conveyance section 16, a sheet feed section 17, and a communication section 18.

The controller 11 includes a CPU, a RAM, a ROM, and the like. First, in response to various signals, the CPU reads various processing programs stored in the ROM and develops the programs in the RAM. The various signals are an operation signal input from an operation part 152, and an instruction signal received by the communication section 18. Next, the CPU integrally controls the operation of the image forming apparatus 10 in cooperation with the various programs expanded in the RAM.

First, the image reading section 12 scans and exposes an image of a document placed on a document plate or an automatic document feeder (ADF) with an optical system of a scanning exposure device. Next, the image reading section 12 reads the reflected light by a line image sensor to obtain an image signal. The image signal is subjected to processing such as analog-to-digital (A/D) conversion, shading correction, and compression, and is then input to the controller 11 as image data.

The image forming section 13 forms an image on a sheet, which is a flat cut sheet, by an electrophotographic method, based on print data. The print data is image data read by the image reading section 12 or image data received from an external device. That is, the image forming section 13 forms a toner image on the sheet. The image forming section 13 forms an image composed of four colors of C, M, Y, and K on the sheet according to pixel values of four colors of each pixel of the image data.

As shown in FIG. 1, the image forming section 13 includes four writing sections 131, an intermediate transfer belt 132, a secondary transfer roller 133, and a fixing section 134.

Four writing sections 131 are arranged in series (tandem) along the belt surface of the intermediate transfer belt 132, and form images of the respective colors of C, M, Y, and K. Each of the writing sections 131 includes an optical scanning section 131*a*, a photoreceptor 131*b*, a developing section 131*c*, a charging section 131*d*, a cleaning section 131*e*, and a primary transfer roller 131*f*. The writing sections 131 have the same configuration except that they form images in different colors.

To form images, the charging section 131*d* of each writing section 131 charges the photoreceptor 131*b*. Thereafter, the optical scanning section 131*a* scans the photoreceptor 131*b* with light flux emitted based on image data and forms an electrostatic latent image. Next, the developing section 131*c* supplies toner and develops the electrostatic latent image. Thus, the image forming section 13 forms an image (a single-color toner image) on the photoreceptor 131*b*.

Next, each of the primary transfer rollers 131*f* sequentially primarily transfers the images formed on the photoreceptors 131*b* to the intermediate transfer belt 132 so that the images overlap. Thus, an image of each color (color toner image) is formed on the intermediate transfer belt 132. The intermediate transfer belt 132 is an image bearing member that is wound around a plurality of rollers to rotate. After the primary transfer, the cleaning section 131*e* removes the toner remaining on the photoreceptor 131*b*.

In the image forming section 13, a sheet is fed from a sheet feed tray T1 at a timing when the image on the rotating intermediate transfer belt 132 reaches the position of the secondary transfer roller 133. One of a pair of secondary transfer rollers 133 comes into pressing contact with the intermediate transfer belt 132, and the other roller forms one of a plurality of rollers around which the intermediate transfer belt 132 is wound. The secondary transfer roller 133 secondarily transfers the image from the intermediate transfer belt 132 onto the sheet by pressure contact and conveys the sheet to the fixing section 134. The fixing section 134 performs a fixing process on the conveyed sheet. The fixing process is a process of fixing an image on a sheet by heating and pressing the sheet with the fixing roller 134*a*. When an image is formed on each side of a sheet, a reversing path 135 reverses the side of the conveyed sheet and then feeds the sheet again to the position of the secondary transfer roller 133.

The storage section 14 is a nonvolatile storage means constituted by a hard disk drive (HDD), a solid state drive (SSD), or the like. The storage section 14 stores various programs, various setting data, and the like in a readable and writable manner from the controller 11.

The operation panel 15 includes a display part 151 that displays various kinds of information to a user, and an operation part 152 that receives an operation input from the user.

The display part 151 may be, for example, a color liquid crystal display (LCD). The display part 151 displays an operation screen or the like (various setting screens, various buttons, an operation state of each function, or the like) according to a display control signal input from the controller 11.

An operation part 152 includes a touch screen provided on a screen of the display part 151, and various hardware keys arranged around the screen of the display part 151.

When a button displayed on the screen is pressed by a finger, a touch pen, or the like, the operation part 152 first detects coordinates of the pressed position by a voltage value. Next, the operation part 152 outputs an operation signal associated with the detected position to the controller 11. Note that the touch screen is not limited to a pressure-sensitive type, and may be, for example, an electrostatic type or an optical type. When the hardware key is pressed, the operation part 152 outputs an operation signal associated with the pressed key to the controller 11.

The conveyance section 16 includes a plurality of roller pairs. The conveyance section 16 conveys a sheet supplied from the sheet feed section 17 to the image forming section 13 and conveys the sheet on which an image is formed by the image forming section 13 to the laminating apparatus 20.

The sheet feed section 17 includes a sheet feed tray T1 and supplies the sheet from the sheet feed tray T1 to the image forming section 13. Sheets of a predetermined sheet type and size are stored in each sheet feed tray T1 for each sheet feed tray T1.

The communication section 18 is an interface that connects the image forming apparatus 10 to a communication network. The communication section 18 has a communication integrated circuit (IC), a communication connector, and the like. Under the control of the controller 11, the communication section 18 transmits/receives various kinds of information to/from the external device connected to the communication network using a predetermined communication protocol. Furthermore, the communication section 18 can also input and output various kinds of information via a universal serial bus (USB).

The laminating apparatus 20 is disposed on a downstream side of the image forming apparatus 10 (image forming section 13) in a sheet conveyance direction. The laminating apparatus 20 laminates the image side of the sheet on which the image has been formed by the image forming section 13.

As illustrated in FIG. 1 and FIG. 2, the laminating apparatus 20 includes a controller 21 (hardware processor), a lamination section (laminator) 22, a cutting section 23, a storage section 24, and a conveyance section 25.

The controller 21 includes a CPU, a RAM, a ROM, and the like. First, the CPU reads various processing programs stored in the ROM and develops the programs in the RAM. Next, the CPU integrally controls the operation of the laminating apparatus 20 in cooperation with the various programs developed in the RAM.

The lamination section 22 performs a laminating process in which a film having an adhesive layer is overlaid on the side of the sheet being conveyed that has been formed with an image by the image forming apparatus 10 (the image side). The film having an adhesive layer is a laminated film F1. That is, the lamination section 22 laminates the image side of the sheet having an image formed thereon.

According to the present embodiment, the conveyance path is provided between the image forming section 13 and the lamination section 22. The conveyance path is longer than at least the length of the shortest recording medium that can be laminated (the length of the shortest recording medium among the recording media that can be laminated).

The lamination section 22 includes a first film roll 221, a second film roll 222, and a laminate fixing section 223.

The first film roll 221 is a roll of a laminate film F1 including a transparent synthetic resin film layer and an adhesive layer. The laminate film F1 has an adhesive layer formed by applying a hot-melt adhesive on one side (the side that comes into contact with the sheet).

The laminate film F1 is conveyed from the first film roll 221 to a nip part of the laminate fixing section 223 and is bonded to the image surface of the sheet. That is, the lamination section 22 laminates the sheet using the laminate film F1 mounted in a state of being wound in a roll shape.

The second film roll 222 is a roll of an under film F2 formed of a transparent synthetic resin film layer. That is, no adhesive layer is formed on the under film F2.

The under film F2 is conveyed from the second film roll 222 to a nip part (the non-image surface of the sheet) of the laminate fixing section 223.

The laminate fixing section 223 includes a pair of rollers. The laminate fixing section 223 sandwiches the sheet and the laminate film F1 in a nip part formed by the pair of rollers and applies at least one of heat and pressure. Thus, the laminate fixing section 223 causes the adhesive layer of the laminate film F1 to adhere to the front surface of the sheet, thereby laminating the sheet and the laminate film F1 together. Note that the laminate fixing section 223 sandwiches the laminate film F1 and the under film F2 between sheets in a nip part formed by a pair of rollers. Thus, the laminate fixing section 223 causes the under film F2 to adhere and bond to the adhesive layer of the laminate film F1. Therefore, the adhesive applied to the laminate film F1 does not come into contact with the path in the path after the laminate fixing section 223.

In the present embodiment, the laminate fixing section 223 includes a heating roller 223*a* and a pressure roller 223*b*. The laminate fixing section 223 applies heating and pressurizing to the sheet and the laminate film F1 pinched in a nip part formed by the heating roller 223*a* and the pressure roller 223*b*. Thus, the laminate fixing section 223 fixes the laminate film F1 to the sheet.

The heating roller (heating means) 223*a* has a halogen heater or the like built-in and heats the laminate film F1 and the sheet in an overlapped state. Thus, the laminate fixing section 223 fuses the adhesive layer of the laminate film F1.

The pressure roller (pressure unit) 223*b* is pressed against the heating roller 223*a* by being urged upward by an urging member (not illustrated) such as a spring. As a result, the pressure roller 223*b* forms a nip portion in surface contact with the heating roller 223*a*. The pressure roller 223*b* presses, against the sheet, the laminate film F1 whose adhesive layer has been melted by the heating roller 223*a*.

The heating roller 223*a* and the pressure roller 223*b* melt the adhesive layer of the laminate film F1 and cause the molten adhesive layer to adhere to the front surface of the sheet for heat compression bonding.

As described above, the lamination section 22 is configured to allow mounting of a laminate film F1 having an adhesive layer and an under film F2 having no adhesive layer. The lamination section 22 conveys and bonds the laminate film F1 to the image surface of the sheet on which the image is formed. The lamination section 22 conveys the under film F2 to the non-image surface of the sheet on which the image is formed.

The cutting section 23 is provided downstream of the lamination section 22 in the sheet conveyance path. The cutting section 23 cuts the laminate film F1 (the laminate film F1 to which the under film F2 is adhered) between the conveyed sheets.

The storage section 24 is a non-volatile storage means including an HDD and an SSD. The storage section 24 stores various programs, various setting data, and the like in a readable and writable manner from the controller 21.

The conveyance section 25 includes a plurality of roller pairs, and conveys, in the laminating apparatus 20, a sheet conveyed from the image forming apparatus 10. When the sheet is to be subjected to lamination processing, the conveyance section 25 conveys the sheet to the lamination section 22 and then to the cutting section 23 via a first conveyance path 251 (see FIG. 1). When the sheet is not to be subjected to lamination processing, the conveyance section 25 conveys the sheet through a second conveyance path 252 (refer to FIG. 1). The second conveyance path 252 is a path that does not pass through the lamination section 22 and the cutting section 23.

Next, control of the image forming system 1 according to the present embodiment will be described with reference to FIGS. 3A to 4B. Note that in the present embodiment, a case will be described in which the controller 11 of the image forming apparatus 10 executes processing, but there is no limitation thereto. The process is a process of adjusting at least one of the lamination speed in the lamination section 22 and the image forming speed in the image forming section 13. For example, the controller 21 of the laminating apparatus 20 may execute the above-described processing. Further, the controller 11 of the image forming apparatus 10 and the controller 21 of the laminating apparatus 20 may execute the processing in cooperation with each other. In addition, a controller (not illustrated) that is provided separately from each apparatus and is communicably connected to each apparatus independently may execute the process.

In the present embodiment, the controller 11 adjusts at least one of the lamination speed in the lamination section 22 and the image forming speed in the image forming section 13.

For example, when lamination is performed by the lamination section 22, the controller 11 adjusts at least one of the lamination speed and the image forming speed. Specifically, the controller 11 performs adjustment such that the interval between the sheets continuously transported to the lamination section 22 is smaller than the interval in a case where the laminating process is not performed by the lamination section 22.

That is, the controller 11 adjusts the interval between the sheets continuously conveyed to the lamination section 22 to be smaller than the interval between the sheets conveyed to the second conveyance path 252. The second conveyance path 252 is a detour that does not pass through the lamination section 22 and the like in a case where lamination processing by the lamination processing section 22 is not performed.

Further, when adjusting at least one of the lamination speed and/or the image forming speed, the controller 11 selects the appropriate speed from options provided for lamination possible speed and/or image forming possible speed. Here, the lamination possible speed is a speed which is set in advance as a selectable lamination speed. Further, the image forming possible speed is a speed set in advance as a selectable image forming speed.

In the present embodiment, the controller 11 adjusts at least one of the lamination speed and the image forming speed, based on the image forming speed, inter-sheet time, the lamination speed, sheet conveyance speed, and sheet length. The inter-sheet time is a time between recording media of the present invention. The sheet conveyance speed is a recording medium conveyance speed of the present invention. The sheet length is the length of the recording medium of the present invention.

Specifically, first, the controller 11 acquires the image forming speed (Vi), the inter-sheet time (Tp), the lamination speed (Vl), the sheet conveyance speed (Vr), and the sheet length (Lp) from the image forming apparatus 10 and the laminating apparatus 20. Note that each piece of information to be acquired may be a fixed value that does not change depending on conditions (a paper type, an apparatus environment, and the like).

Next, the controller 11 calculates image forming time (Ti), lamination time (Tl), and sheet conveyance time (Tr) based on the acquired information. Specifically, the controller 11 calculates the image forming time (Ti), the lamination time (Tl), and the sheet conveyance time (Tr) based on the following equations (1) to (3).

$$\text{image forming time}(Ti)=\text{sheet length}(Lp)/\text{image forming speed}(Vi) \quad (1)$$

$$\text{lamination time}(Tl)=\text{sheet length}(Lp)/\text{lamination speed}(Vl) \quad (2)$$

$$\text{sheet conveyance time}(Tr)=[\text{“distance}(Lr)\text{between image forming section } \mathbf{13} \text{ and lamination section22”}-\text{sheet length}(Lp)]/\text{sheet conveyance speed}(Vr) \quad (3).$$

Then, the controller 11 adjusts the image forming speed (Vi) or the lamination speed (Vl) based on the acquired inter-sheet time (Tp), the calculated image forming time (Ti), the calculated lamination time (Tl), and the calculated sheet conveyance time (Tr). Specifically, the controller 11 adjusts the image forming speed (Vi) or the lamination speed (Vl) so that “sheet conveyance time (Tr)+lamination time (Tl)” becomes closer to “inter-sheet time (Tp)+image forming time (Ti)+sheet conveyance time (Tr)”.

Figure 3A:
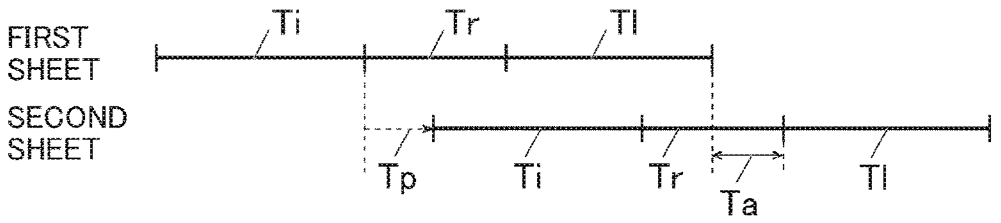
FIG. 3A and FIG. 3B are diagrams illustrating an example of control for shortening inter-lamination time by increasing image forming speed.
Figure 3B:
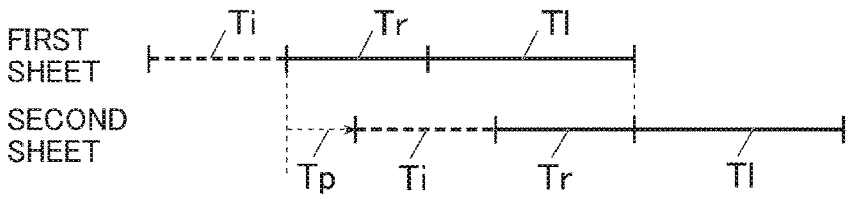

FIG. 3A and FIG. 3B illustrate an example of control for increasing the image forming speed and shortening the inter-lamination time (Ta). FIG. 3A is a diagram illustrating a state before the adjustment of the image forming speed. FIG. 3B is a diagram illustrating a state after the adjustment of the image forming speed.

For example, in the case of a configuration capable of increasing the image forming speed, the controller 11 makes an adjustment so that the image forming speed (Vi) becomes higher than a reference speed (see FIG. 3B). The reference speed is an image forming speed in a case where no lamination is performed. That is, the controller 11 makes an adjustment so that “the sheet conveyance time (Tr)+the lamination time (Tl)” becomes closer to “the inter-sheet time (Tp)+the image forming time (Ti)+the sheet conveyance time (Tr)”.

Thus, the image forming time (Ti) can be shortened. Therefore, it is possible to shorten the time from the completion of the lamination on the first sheet to the start of the lamination on the second sheet. The time from the completion of the lamination on the first sheet to the start of lamination of the second sheet is the inter-lamination time (Ta). In the example illustrated in FIG. 3B, the inter-lamination time (Ta) is 0. Accordingly, the interval between the sheets can be reduced.

Figure 4A:
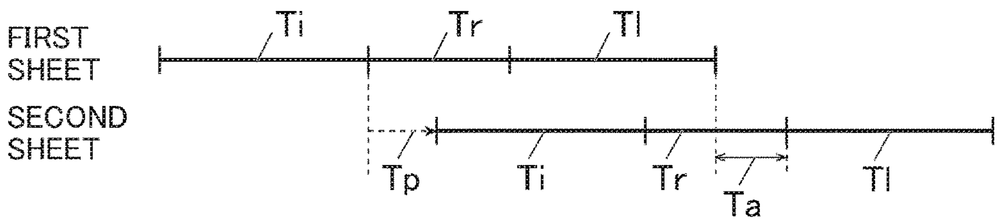
FIG. 4A and FIG. 4B are diagrams showing an example of control for reducing the inter-lamination time by decreasing lamination speed.
Figure 4B:
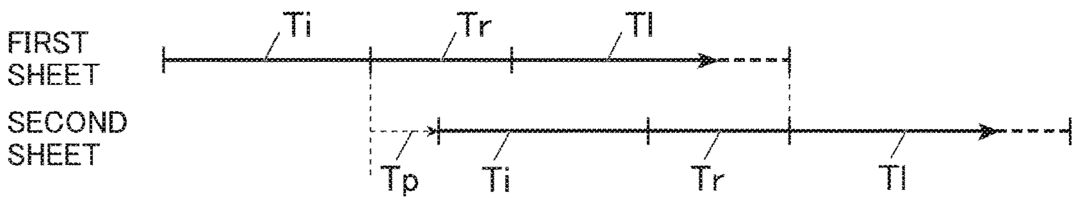

FIG. 4A and FIG. 4B show an example of control for shortening the inter-lamination time (Ta) by decreasing the lamination speed. Note that FIG. 4A is a diagram illustrating a state before the adjustment of the lamination speed. FIG. 4B is a diagram illustrating a state after the adjustment of the image forming speed.

For example, in the case of a configuration in which the lamination speed can be decreased, the controller 11 makes an adjustment so that the lamination speed (V1) becomes lower than the reference speed (see FIG. 4B). The reference speed is an image forming speed in a case where no lamination is performed. That is, the controller 11 makes an adjustment so that “the sheet conveyance time (Tr)+the lamination time (Tl)” becomes closer to “the inter-sheet time (Tp)+the image forming time (Ti)+the sheet conveyance time (Tr)”. Note that the image forming speed and the lamination speed, which are used as references (comparison targets) when the speed is increased or decreased, are basically the same speed. The reference image forming speed is an image forming speed in a case where no lamination is performed. On the other hand, the reference lamination speed is a lamination speed in a case where the lamination is not performed. However, the lamination speed in a case where the lamination is not performed cannot exist. Therefore, the reference lamination speed is substituted by the image forming speed which is the same speed as the lamination speed.

Accordingly, the lamination time (Tl) can be extended. Therefore, it is possible to shorten the time from the completion of the lamination on the first sheet to the start of the lamination on the second sheet. The time from the completion of the lamination on the first sheet to the start of lamination of the second sheet is the inter-lamination time (Ta). In the example illustrated in FIG. 4B, the inter-lamination time (Ta) is 0. Accordingly, the interval between the sheets can be reduced.

The adjustment of decreasing the lamination speed (Vl) is not limited to the above. For example, the adjustment to decrease the lamination speed may be an adjustment in which sheet conveyance for lamination is temporarily stopped, the lamination time is extended, and then the sheet conveyance is resumed.

In a case where both the image forming speed and the lamination speed are adjustable, both speed adjustments may be combined.

As described above, the image forming system 1 according to the present embodiment includes the image forming section 13, the lamination section 22, and the controller 11. The image forming section 13 forms an image on a recording medium which is a flat cut sheet. The lamination section 22 is located on the downstream side of the image forming section 13 in the recording medium conveyance direction. The lamination section 22 laminates the recording medium on which the image is formed by the image forming section 13. The controller 11 adjusts at least one of the lamination speed in the lamination section 22 and the image forming speed in the image forming section 13.

Therefore, according to the image forming system 1 of the present embodiment, it is possible to appropriately adjust the distance between sheets when sheets that are flat cut sheets are continuously conveyed. Therefore, it is possible to obtain an appropriate product while suppressing waste of the expensive laminate film.

In addition, in a case where the lamination is performed by the lamination section 22, the controller 11 adjusts at least one of the lamination speed and the image forming speed. Specifically, the controller 11 performs adjustment such that the interval between the recording media that are continuously transported to the lamination section 22 is smaller than the interval between the recording media that are not laminated by the lamination section 22.

Therefore, in a case where the lamination is performed, the distance between the sheets can be reduced. Therefore, waste of the expensive laminate film can be suppressed. Further, when adjusting at least one of the lamination speed and/or the image forming speed, the controller 11 selects the appropriate speed from options provided for lamination possible speed and/or image forming possible speed.

Therefore, it is possible to determine the speed to be adjusted from among the speeds set to be selectable in advance. Therefore, the burden of the speed adjustment processing can be reduced.

Further, the controller 11 adjusts the image forming speed so that "the recording medium conveyance time+the lamination time" approaches "the time between recording media+the image forming time+the recording medium conveyance time".

Therefore, in a case where the lamination is performed, the distance between the sheets can be reduced. Therefore, waste of the expensive laminate film can be suppressed.

In addition, the controller 11 adjusts the lamination speed so that "the recording medium conveyance time+the lamination time" approaches "the time between recording media+the image forming time+the recording medium conveyance time".

Therefore, in a case where the lamination is performed, the distance between the sheets can be reduced. Therefore, waste of the expensive laminate film can be suppressed.

The lamination section 22 laminates the recording medium using the laminate film mounted wound in a roll.

Therefore, it is possible to appropriately adjust a distance between sheets laminated using a laminate film that is continuously connected. Therefore, it is possible to obtain an appropriate product while suppressing waste of the expensive laminate film.

The lamination section 22 is configured to allow mounting of a laminate film having an adhesive layer and an under film having no adhesive layer. The lamination section 22 conveys and bonds the laminate film to the image surface of the recording medium on which the image has been formed. The lamination section 22 conveys an under film to the non-image surface of a recording medium on which an image is formed.

Therefore, the under film F1 can be adhered to the adhesive layer of the laminate film F2 between the sheets. Therefore, in the path after the laminate fixing section 223, the adhesive applied to the laminate film can be prevented from coming into contact with the path.

Between the image forming section 13 and the lamination section 22, a conveyance path is provided which is at least longer than the length of the shortest recording medium that can be laminated.

Therefore, it is possible to prevent the leading end of the sheet from entering the lamination section 22 during the image formation by the image forming section 13. Thus, the influence of other configurations can be eliminated when the lamination speed or the image forming speed is adjusted. Other configurations are the image forming section 13 when the lamination speed is adjusted and the lamination section 22 when the image forming speed is adjusted. Therefore, the speed adjustment can be appropriately performed.

The controller 11 adjusts at least one of the lamination speed and/or the image forming speed based on the image forming speed, the time between recording media, the lamination speed, the recording medium conveyance speed, and the recording medium length.

Therefore, the lamination speed and the image forming speed can be adjusted based on the information acquired from the image forming apparatus 10 and the laminating apparatus 20. Therefore, it is possible to appropriately perform the speed adjustment according to the setting of the apparatus.

Although the specific description has been given above on the basis of the embodiment according to the present invention, the present invention is not limited to the above-described embodiment, and modifications can be made without departing from the spirit and scope of the present invention.

For example, although the configuration in which "the sheet conveyance time (Tr)+the lamination time (Tl)" is adjusted to be close to "the inter-sheet time (Tp)+the image forming time (Ti)+the sheet conveyance time (Tr)" has been described as an example in the above embodiment, there is no limitation thereto. For example, in a case where an interval between sheets which are continuously conveyed is too short, a problem may occur. The disadvantage is, for example, a disadvantage that the first sheet and the second sheet overlap each other in the lamination and an appropriate product is not obtained. Therefore, each speed may be adjusted in a case where the distance between the continuously transported sheets is too short, and the first sheet and the second sheet overlap during the laminating process. Each speed is an image forming speed (Vi) or a lamination speed (Vl). Specifically, the controller 11 makes an adjustment so that "the sheet conveyance time (Tr)+the lamination time (Tl)" becomes closer to "the inter-sheet time (Tp)+the image forming time (Ti)+the sheet conveyance time (Tr)".

Figure 5A:
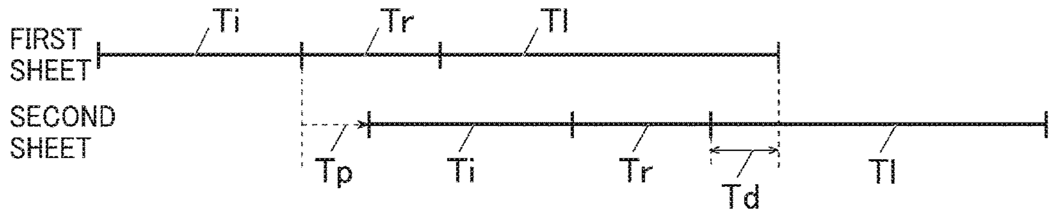
FIG. 5A and FIG. 5B are diagrams showing an example of control for reducing lamination overlapping time by decreasing the image forming speed.
Figure 5B:
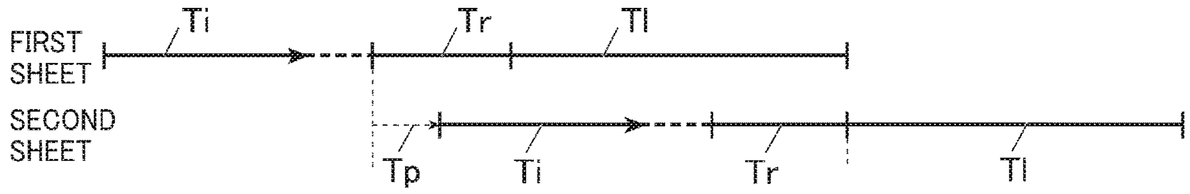

FIG. 5A and FIG. 5B illustrate an example of control for decreasing the image forming speed to reduce the lamination overlapping time (Td). FIG. 5A is a diagram illustrating a state before the adjustment of the image forming speed. FIG. 5B is a diagram illustrating a state after the adjustment of the image forming speed.

For example, in the case of a configuration in which the image forming speed can be decreased, the controller 11 makes an adjustment to make the image forming speed (Vi) lower than the reference speed (see FIG. 5B). The reference speed is an image forming speed in a case where no lamination is performed. That is, the controller 11 makes an adjustment so that "the sheet conveyance time (Tr)+the lamination time (Tl)" becomes closer to "the inter-sheet time (Tp)+the image forming time (Ti)+the sheet conveyance time (Tr)".

Thus, the image forming time (Ti) can be extended. Therefore, the time (the lamination overlapping time (Td)) that the first sheet and the second sheet overlap each other during the lamination can be reduced. Therefore, it is possible to suppress overlapping of sheets during the lamination.

Figure 6A:
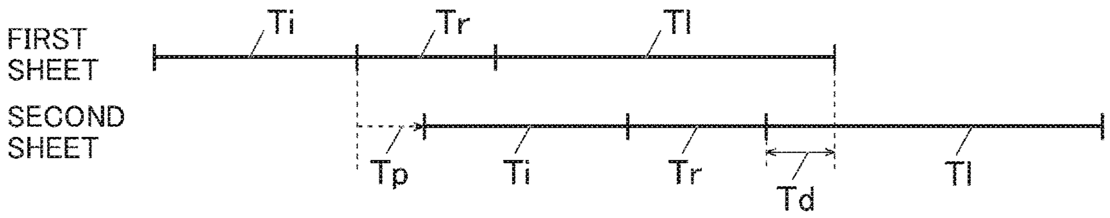
FIG. 6A and FIG. 6B are diagrams showing an example of control for reducing the lamination overlapping time by increasing the lamination speed.
Figure 6B:
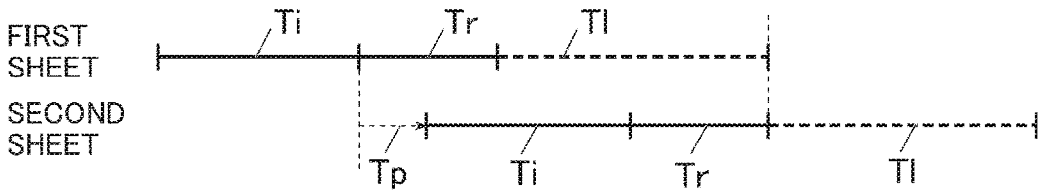

FIG. 6A and FIG. 6B show an example of control for reducing the lamination overlapping time (Td) by increasing the lamination speed. Note that FIG. 6A is a diagram illustrating a state before the adjustment of the lamination speed. FIG. 6B is a diagram illustrating a state after the adjustment of the image forming speed.

For example, in the case of a configuration in which the lamination speed can be increased, the controller 11 adjusts the lamination speed (Vl) to be higher than the reference speed (see FIG. 6B). The reference speed is an image forming speed in a case where no lamination is performed. That is, the controller 11 makes an adjustment so that "the sheet conveyance time (Tr)+the lamination time (Tl)" becomes closer to "the inter-sheet time (Tp)+the image forming time (Ti)+the sheet conveyance time (Tr)".

As a result, the lamination time (Tl) can be shortened. Therefore, the time (the lamination overlapping time (Td)) that the first sheet and the second sheet overlap each other during the lamination can be reduced. Therefore, it is possible to suppress overlapping of sheets during the lamination.

Note that in a case where the interval between successively conveyed sheets is too short, the controller 11 can widen the interval between sheets (extend the inter-lamination time (Ta)). For example, even in a case where the first sheet and the second sheet do not overlap during the lamination, the controller 11 can increase the interval between the sheets.

In this case, the controller 11 performs control to adjust each speed so that "the sheet conveyance time (Tr)+the lamination time (Tl)" becomes far from "the inter-sheet time (Tp)+the image forming time (Ti)+the sheet conveyance time (Tr)". Each speed is an image forming speed (Vi) or a lamination speed (Vl).

Figure 7A:
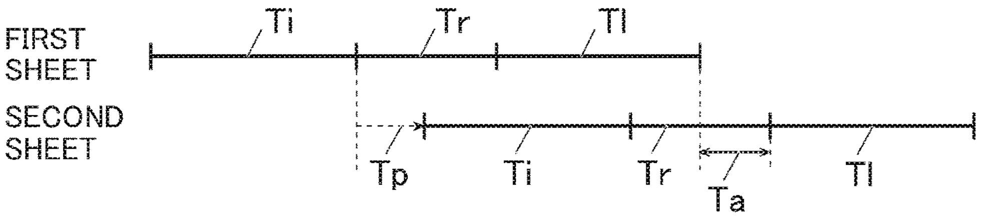
FIG. 7A and FIG. 7B are diagrams showing an example of control for extending the inter-lamination time by decreasing the image forming speed.
Figure 7B:
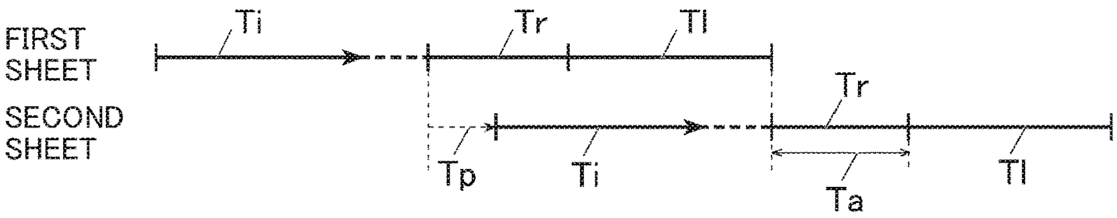

FIG. 7A and FIG. 7B show an example of control for increasing the inter-lamination time (Ta) by decreasing the image forming speed. FIG. 7A is a diagram illustrating a state before the adjustment of the image forming speed. FIG. 7B is a diagram illustrating a state after the adjustment of the image forming speed.

For example, in the case of a configuration in which the image forming speed can be decreased, the controller 11 makes an adjustment to make the image forming speed (Vi) lower than the reference speed (see FIG. 7B). The reference speed is an image forming speed in a case where no lamination is performed. That is, the controller 11 makes an adjustment so that "the sheet conveyance time (Tr)+the lamination time (Tl)" becomes farther from "the inter-sheet time (Tp)+the image forming time (Ti)+the sheet conveyance time (Tr)".

Thus, the image forming time (Ti) can be extended. Therefore, it is possible to extend the time from the completion of the lamination on the first sheet to the start of the lamination on the second sheet. The time from the completion of the lamination on the first sheet to the start of lamination of the second sheet is the inter-lamination time (Ta). Accordingly, the interval between the sheets can be increased.

Figure 8A:
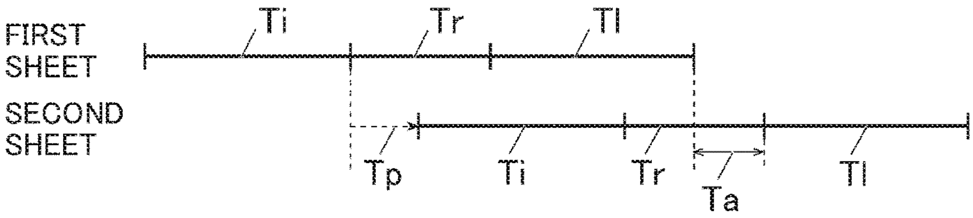
FIG. 8A and FIG. 8B are diagrams showing an example of control for increasing the inter-lamination time by increasing the lamination speed.
Figure 8B:
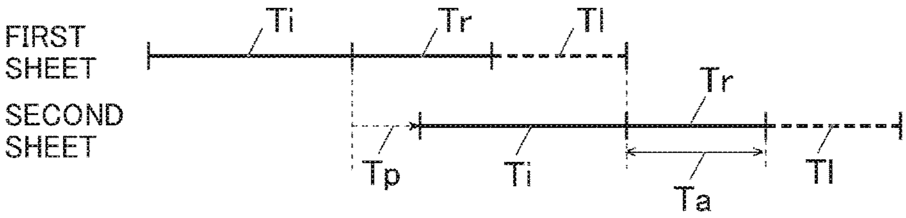

FIG. 8A and FIG. 8B show an example of control for increasing the inter-lamination time (Ta) by increasing the lamination speed. Note that FIG. 8A is a diagram illustrating a state before the adjustment of the lamination speed. FIG. 8B is a diagram illustrating a state after the adjustment of the image forming speed.

For example, in the case of a configuration in which the lamination speed can be increased, the controller 11 adjusts the lamination speed (Vl) to be higher than the reference speed (see FIG. 8B). The reference speed is an image forming speed in a case where no lamination is performed. That is, the controller 11 makes an adjustment so that "the sheet conveyance time (Tr)+the lamination time (Tl)" becomes farther from "the inter-sheet time (Tp)+the image forming time (Ti)+the sheet conveyance time (Tr)".

As a result, the lamination time (Tl) can be shortened. Therefore, it is possible to extend the time from the completion of the lamination on the first sheet to the start of the lamination on the second sheet. The time from the completion of the lamination on the first sheet to the start of lamination of the second sheet is the inter-lamination time (Ta). Accordingly, the interval between the sheets can be increased.

Furthermore, in the embodiment described above, the laminate fixing section 223 presses, against the sheet, the laminate film F1 whose adhesive layer is melted by the heating roller223*a*. Thus, the laminate fixing section 223 causes the melted adhesive layer to adhere to the front surface of the sheet but is not limited to this. For example, the laminate fixing section 223 may press, against the sheet, a laminate film F1 on which an adhesive layer that can be bonded at room temperature is formed. Thus, the laminate fixing section 223 can cause the adhesive layer to adhere to the front surface of the sheet. In this case, the pressure roller 223*b* presses the laminate film F1, on which the adhesive layer capable of adhering at room temperature is formed, against the sheet.

Figure 9:
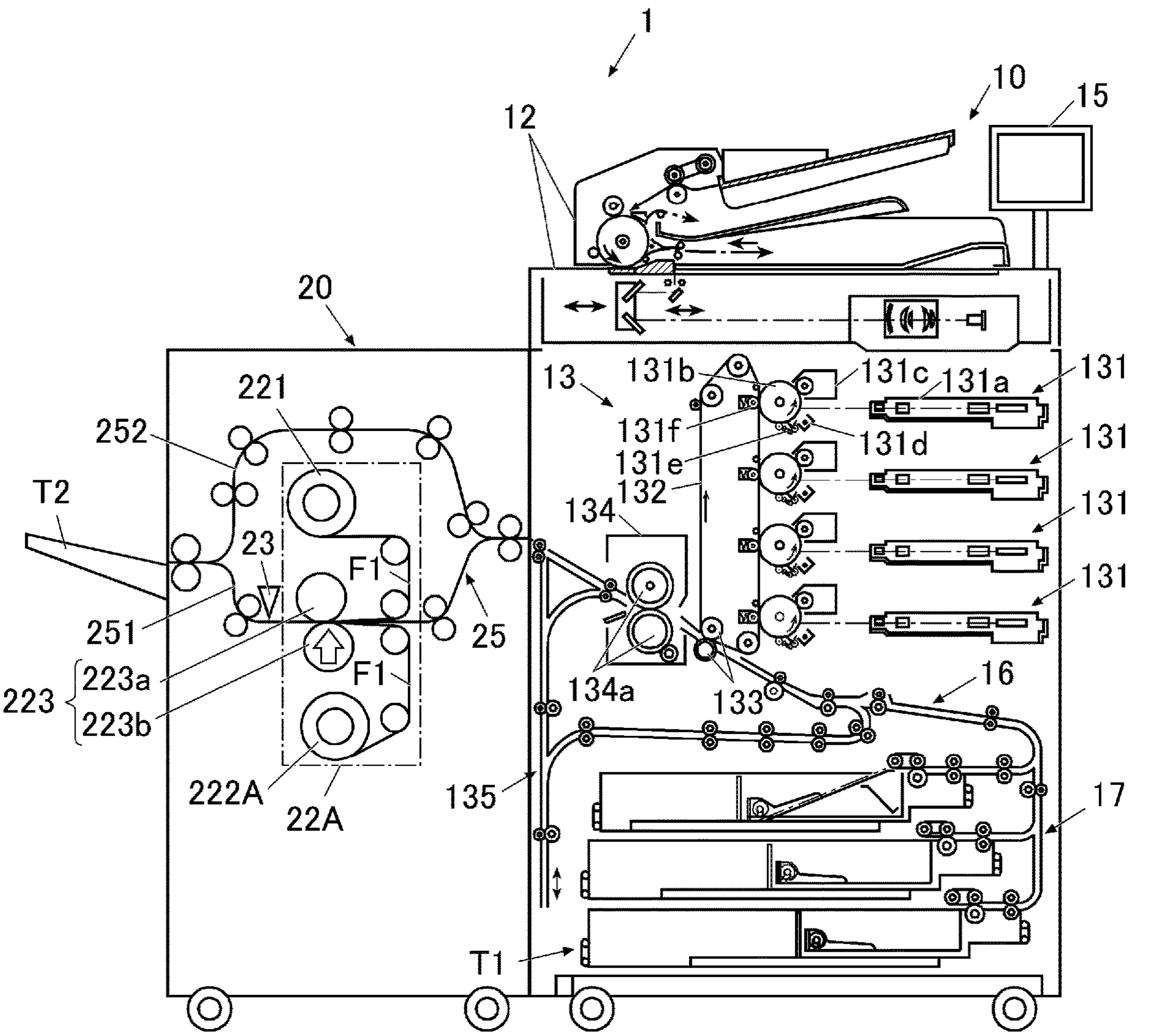
FIG. 9 is a diagram illustrating a schematic configuration of an image forming system according to a modification example.

In addition, in the above-described embodiment, the configuration in which the second film roll 222 is formed of the under film F2 on which the adhesive layer is not formed has been described as an example, but the present invention is not limited thereto. For example, as illustrated in FIG. 9, a second film roll 222A may be formed of a laminate film F1 similarly to the first film roll 221.

In this case, the lamination section 22A is configured to allow mounting of the plurality of laminate films F1. The lamination section 22A conveys and bonds one of the plurality of laminate films F1 to the front surface of the recording media on which the image has been formed. The one laminate film F1 is the laminate film F1 included in the first film roll 221. The lamination section 22A conveys and bonds another laminate film F1 to the back surface of the recording media on which an image has been formed. The other laminate film F1 is the laminate film F1 included in the second film roll 222A.

Thus, while both sides of the sheet are laminated at the same time, the laminate films can be bonded together between the sheets. Therefore, it is possible to secure the productivity of the lamination. In addition, in the path after the laminate fixing section 223, the adhesive applied to the laminate film can be prevented from coming into contact with the path.

Furthermore, although the image forming system 1 in which the image forming apparatus 10 and the laminating apparatus 20 are separate has been described as an example of the configuration for carrying out the present invention in the above embodiment, there is no limitation thereto. For example, the image forming section 13 and the lamination section 22 maybe configured as an integrated apparatus (image forming apparatus).

Although the configuration in which the image forming apparatus 10 and the laminating apparatus 20 are directly connected to each other has been illustrated in the above embodiment, there is no limitation thereto. For example, the image forming apparatus 10 and the laminating apparatus 20 may be indirectly connected to each other via a third device. The third device is, for example, an image reading device. That is, the third device may be disposed between the image forming apparatus 10 and the laminating apparatus 20. The third device may be one device or a plurality of devices.

In addition, the detailed configuration of each of the devices configuring the image forming system and the detailed operation of each of the devices can be appropriately changed without departing from the spirit and scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:

an image former configured to form an image on a recording medium that is a flat cut sheet;

a laminator that is disposed on a downstream side of the image former in a conveyance direction of the recording medium and that laminates the recording medium on which the image is formed by the image former; and a hardware processor configured to adjust at least one of a lamination speed in the laminator and/or an image forming speed in the image former;

wherein the hardware processor is configured to adjust at least one of the lamination speed and/or the image forming speed such that, in a case that the lamination is performed by the laminator, an interval between the recording media that are continuously transported to the laminator is smaller than the interval in a case that the lamination is not performed by the laminator.

2. The image forming system according to claim 1, wherein the hardware processor adjusts at least one of the lamination speed and/or the image forming speed, and selects from options provided for a lamination possible speed and/or an image forming possible speed.

3. The image forming system according to claim 1, wherein the hardware processor adjusts the image forming speed so that a sum of a recording medium conveyance time and a lamination time is less than or equal to a sum of a time between recording media, an image forming time, and a recording medium conveyance time.

4. The image forming system according to claim 1, wherein the hardware processor adjusts the lamination speed so that a sum of a recording medium conveyance time and a lamination time is less than or equal to a sum of a time between recording media, an image forming time, and a recording medium conveyance time.

5. The image forming system according to claim 1, wherein the image former forms an image on the recording medium by an electrophotographic method.

6. The image forming system according to claim 1, wherein the laminator laminates the recording medium using a laminate film mounted in a state of being wound in a roll shape.

7. The image forming system according to claim 1, wherein the laminator includes, a heater that is configured to melt an adhesive layer of a laminate film; and a presser that is configured to press against the recording medium the laminate film in which the adhesive layer is melted by the heater.

8. The image forming system according to claim 1, wherein the laminator includes a presser that is configured to press against the recording medium a laminate film having an adhesive layer capable of adhering at room temperature.

9. The image forming system according to claim 1, wherein, the laminator is configured such that a plurality of laminate films can be mounted, and the laminator conveys and adheres one of the plurality of laminate films to a front surface of the recording medium on which the image is formed, and another of the plurality of laminate films to a back surface of the recording medium on which the image is formed.

10. The image forming system according to claim 1, wherein, the laminator is configured such that a laminate film having an adhesive layer and an under film not having an adhesive layer can be mounted, and the laminator conveys and adheres the laminate film to an image surface of the recording medium on which the image is formed and conveys the under film to a non-image surface of the recording medium on which the image is formed.

11. The image forming system according to claim 1, wherein a conveyance path that is longer than at least a shortest recording medium length that can be laminated is provided between the image former and the laminator.

12. The image forming system according to claim 1, wherein the hardware processor adjusts at least one of the laminating speed and/or the image forming speed based on another of the image forming speed, a time between recording media, the lamination speed, a recording medium conveyance speed, and a recording medium length.

13. The image forming system according to claim 1, wherein the hardware processor is independently and communicably connected to the image former and the laminator.

* * * * *